Aug. 4, 1953  F. L. DAVIS  2,647,294
RELEASABLE FASTENER
Filed Sept. 23, 1949  2 Sheets-Sheet 1
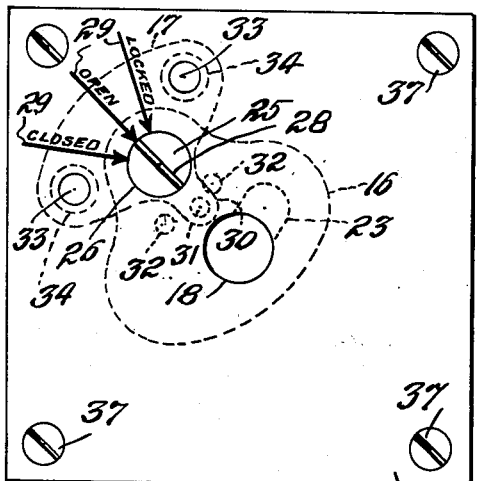
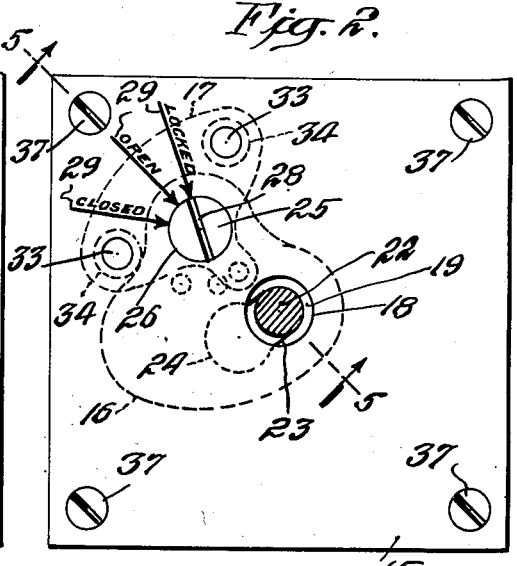
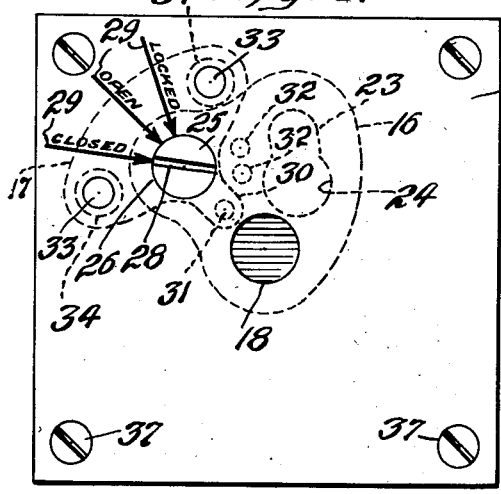
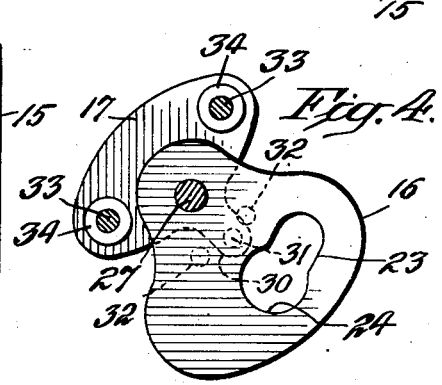
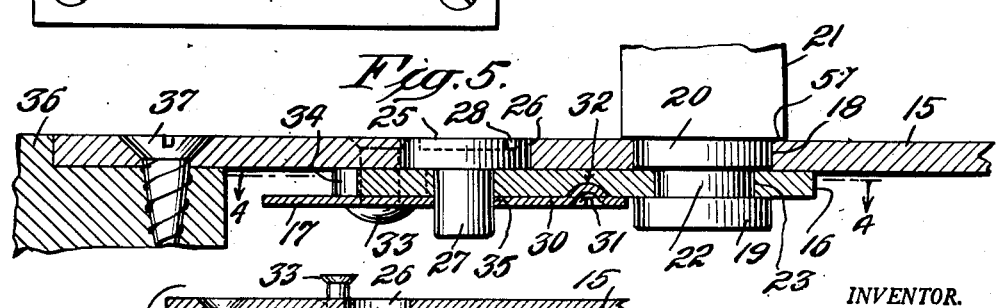
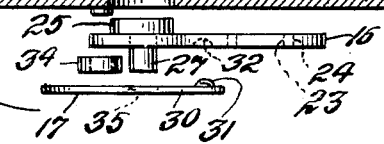
INVENTOR.
FRANK L. DAVIS
BY
ATTORNEY Aug. 4, 1953
F. L. DAVIS
2,647,294
RELEASABLE FASTENER
Filed Sept. 23, 1949
2 Sheets-Sheet 2
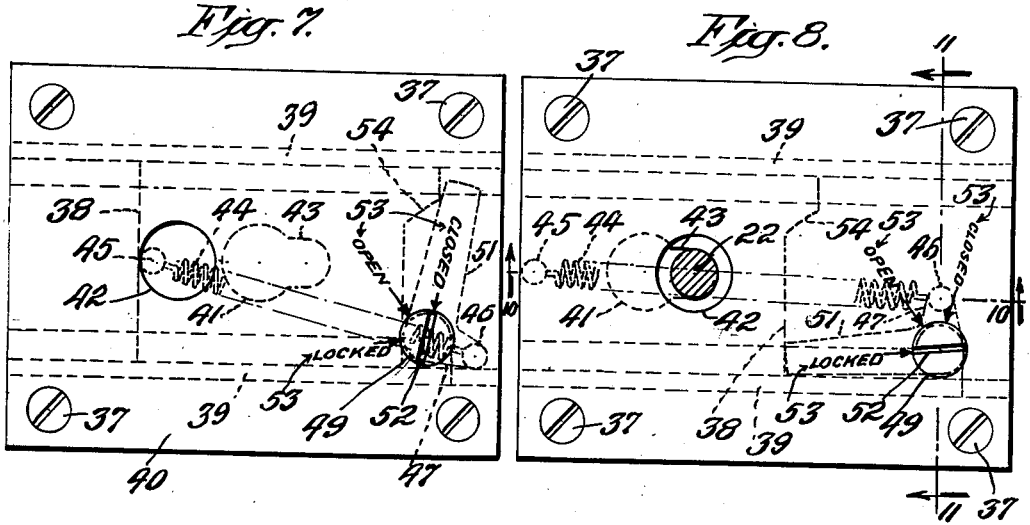
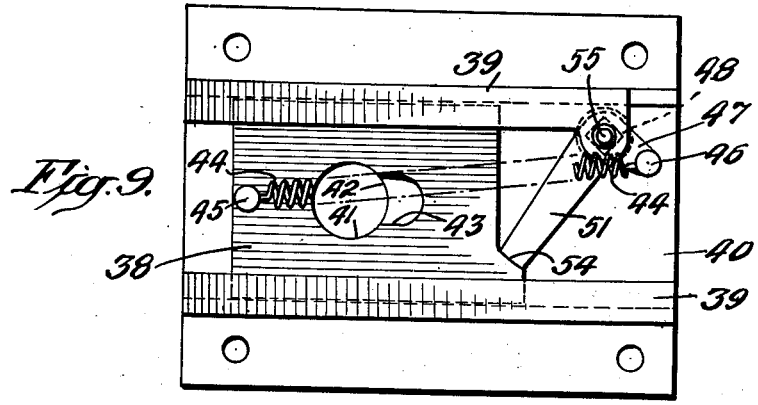
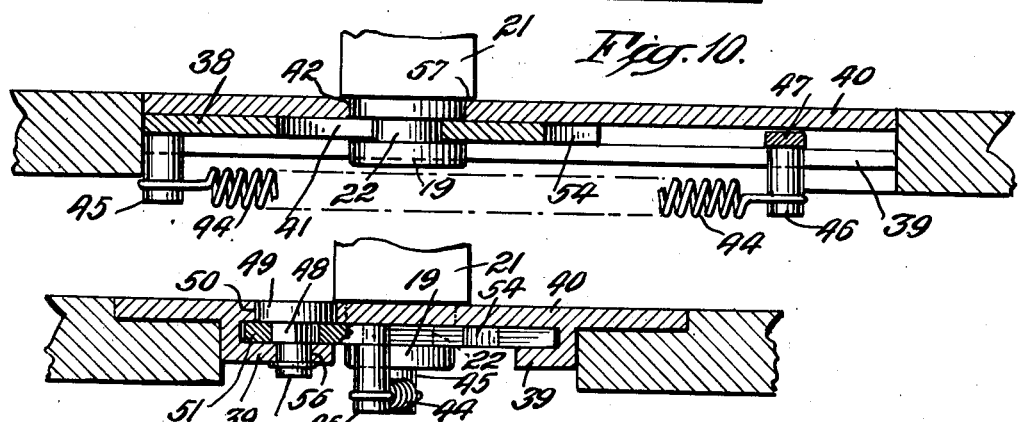
INVENTOR.
FRANK L. DAVIS
BY
ATTORNEY Patented Aug. 4, 1953

2,647,294

UNITED STATES PATENT OFFICE 2,647,294

RELEASABLE FASTENER

Frank L. Davis, College Point, N. Y.

Application September 23, 1949, Serial No. 117,475

8 Claims. (Cl. 24—223)

The invention herein disclosed relates to fasteners for releasably holding bolt or stud-like elements and for removably securing in place objects such as chairs, tables and other pieces of furniture, shelving and various forms of connectors and supports.

Objects of the invention are to provide a simple, substantial fastener of this type, consisting of but few parts, occupying but small space and while rugged and strong, being relatively light in weight.

Other special objects of the invention are to provide a fastener which can be quickly and easily mounted in position in a wall, floor or other such support flush with the surface of the support and which when not in use will be closed and substantially flush with the supporting surface.

A further important object of the invention is to provide a fastener of the character indicated which will be self-locking so as to remain in the closed, open or securing position to which it may have been set.

Other desirable objects and the novel features through which the purposes of the invention are attained are set forth or will appear in the course of the following specification.

The drawings accompanying and forming part of the specification illustrate certain present preferred embodiments of the invention. Structure, however, may be modified and changed as regards the immediate illustration, all within the true intent and scope of the invention as hereinafter defined and claimed.

Fig. 1 in the drawings is a plan view of one of the fasteners, in the open position ready to receive the end of a bolt or other object to be secured;

Fig. 2 is a similar view showing the device in the locked position with a bolt or stud secured thereby appearing in section;

Fig. 3 is a plan view of the device in the closed position;

Fig. 4 is a horizontal sectional view as on the plane of line 4—4 of Fig. 5, showing the two parts, the shear plate and spring retainer plate, immediately below the supporting plate;

Fig. 5 is an enlarged broken cross sectional detail as on substantially the plane of line 5—5 of Fig. 2, showing a bolt or stud member locked in position;

Fig. 6 is a broken part sectional view showing the three essential parts, the supporting plate, shear plate and retainer plate, in separated relation;

Figs. 7 and 8 are plan views of another form of the invention in which the locking is accomplished by a slide plate instead of a swing plate, showing it in these two views in closed and locked positions, respectively;

Fig. 9 is a bottom view of this same device in the open position, the plate closing spring partly broken away;

Figs. 10 and 11 are enlarged broken sectional details on substantially the planes of lines 10—10 and 11—11, respectively, of Fig. 8.

In the first form of the invention shown in Figs. 1 to 6, there are but three main parts, a supporting plate 15 forming the base of the device, a shear plate 16 immediately beneath or in back of the base plate and a spring retainer plate 17 immediately below the shear plate and holding it tensioned against the back or underside of the supporting plate.

The supporting plate 15 is shown as having an opening 18 to pass the head portion 19 and accommodate the corresponding size stem portion 20 of the bolt or stud-like element 21.

The secured member 21 may be the leg of a chair or table, an eye-bolt for tie-down equipment, the stud on a partition wall, shelf or other structural element; the fastener disclosed being adapted to secure, definitely position and hold all various kinds of such objects.

In addition to the end or head portion 19 and the corresponding centering portion 20, the member 21 has a reduced neck portion 22 between the substantially equal diameter annular shoulders provided by parts 19 and 20, of a width slightly greater than the thickness of the shear plate 16 and of a diameter slightly less than the diameter and width of the smaller portion 23 of a keyhole slot formed in the shear plate.

The larger portion 24 of this keyhole slot in the shear plate is of slightly greater diameter than the head 19 of the secured member so as to readily pass the same when the shear plate is in the open position shown in Fig. 1, with this larger portion in registry with the opening 18 in the supporting plate.

The pivotal mounting of the shear plate is effected, in the illustration, by a stud 25 fixed on top of this plate and rotatably seated in a circular opening 26 provided in the supporting plate.

The pivot stud 25 is shown as having a pendent stem 27 extended downward through and welded or otherwise rigidly secured to the shear plate.

The pivot stud 25 on the upper face of the shear plate is shown as seating flush in the bearing 26 in the supporting plate and as having a cross slot 28 therein by which it and the shear plate may be turned into different angular positions.

This screw-driver slot 28 is further shown in the illustration as utilized as an index to register with the markings 29 such as "Closed," "Open" and "Locked," on the supporting plate, to show the actual positions of the shear plate beneath the supporting plate.

The retainer 17 serves both to support the shear plate on the back of the supporting plate and to hold it in the position to which it has been turned. It may be formed, therefore, of a thin plate of spring steel or other stiff spring material and it is shown as formed with a projecting tongue or extension 30 of reduced width carrying an upward embossment 31 engageable in seats 32 in the underside of the shear plate, positioned to locate and hold the shear plate in the three positions of adjustment described.

The retainer plate is secured in properly spaced relation to the supporting plate to hold the shear plate closely confined to but slidable across the back of the supporting plate by relatively widely spaced rivets 33 extending through the supporting plate and retainer and spacing washers 34 interposed on the rivets between the supporting plate and retainer.

As shown in Figs. 5 and 6, the dependent stem portion 27 of the pivot stud 25 has a bearing in the opening 35 in the retainer plate and, as shown in Fig. 4, the mounting rivets 33 are spaced to opposite sides of and in back of the pivotal axis of the stud 25 and dependent stem 27, providing ample support of the swinging shear plate on the retainer and firm holding engagement of the spring detent 31 with the underside of the shear plate. This arrangement, furthermore, locates the spacing washers 34 in position to serve as abutments limiting the swinging action of the shear plate in opposite directions, as particularly shown in Figs. 2 and 3.

The supporting plate, with the pivotally mounted shear plate and retainer, forms a thin, flat assembly of small over-all dimensions which can be readily mounted in the floor, wall or other position where it may be required.

The shape of the supporting plate may be varied to suit different requirements. Instead of being square as shown in Figs. 1, 2 and 3, it may be circular, oval, triangular or other angular shape and it may be mounted in various ways, for instance as shown in Fig. 5, by countersinking it into a supporting structure 36 and securing it there by screws or other fastenings 37.

The supporting plate structure 15 is made heavy enough to carry the load imposed by the attached member 21. To assure that pressure applied by this element will be carried by the supporting plate and not applied directly to the underlying shear plate 16, the annular shoulder portion 20 which enters and is centered at 18 in the supporting plate is preferably made of less width than the thickness of the supporting plate.

The spring force of the retainer plate holds the shear plate tightly against the back of the supporting plate, preventing rattling or looseness, and the spring detent connection between the two is sufficient to hold the shear plate firmly in either the open position, Fig. 1, ready to receive the object to be secured, in the securing position interlocked with the object as in Fig. 2, or in the position closing the object receiving opening 18, shown in Fig. 3.

In the form of the invention shown in Figs. 7 to 11, the locking plate is slidable in guides in a straight line instead of slidable in a rotary path against the back of the supporting plate, as in the first form described.

In these latter views the locking plate 38 is a parallel sided element slidable in guides 39 at the underside or on the back of the supporting plate 40, and has a keyhole slot with a large end portion 41 to register with the opening 42 in the supporting plate and a narrower portion 43 to close about the reduced neck portion 22 of the secured member 21.

In this particular construction the slide plate 38 is biased toward the closed position shown in Fig. 7, by a coil spring 44 connected between a post 45 on the slide plate and a post 46 carried by an arm 47 projecting from the squared shank portion 48 of the rotary stud or actuator 49 journaled in the seat 50 provided in the supporting plate.

This rotary actuating element 49 carries an angularly projecting arm 51, Fig. 9, which engages the near end of the slide so that rotation of this member, through the arm 51, will effect positioning of the slide against tension of the spring 44.

For purposes of turning this controller, it is shown provided with a screw-driver slot 52, similar to the turning stud 25 in the first form, so that it may be turned by a screw-driver or like tool to the various positions of adjustment.

This screw-driver slot 52 is utilized also in the second embodiment as an index registering with suitable markings 53 on the supporting plate to show whether the locking plate is in the open, closed or locked position.

In Fig. 7 the controlling or positioning member 49 is shown turned all the way to the right to the "Closed" position with the spring 44 holding the slide plate all the way over to the right against the axial portion of the lever arm 51 and with the plate closing the opening 42 in the supporting plate.

Fig. 8 shows the controller 49 turned all the way to the left and with the lever arm 51 in engagement with the end of the plate, thrusting it all the way to the left, with the smaller portion 43 of the keyhole slot engaged about the reduced neck portion 22 of the supported object.

Fig. 9 shows the plate in the intermediate, open position with the larger end 41 of the keyhole slot in registry with the opening 42 in the supporting plate, held in this position by the lever arm 51 engaging the inclined cam shoulder 54 on the end of the plate.

The plate is definitely held in each one of the three positions described, in the first or closed position, Fig. 7, by the pull of spring 44, in the locked position, by the lever arm 51 which, as shown in Fig. 8, is pulled past dead center position by spring 44, and in the open position, Fig. 9, by engagement of arm 51 against the inclined cam shoulder 54, held so by the spring 44.

The lever arm 51 is positioned in line with the end of the slide plate by being located in one of the guideways 39 for this plate, as shown in Fig. 11, and maintained in this relation by the shank or stem portion 55 of the operating member 49 being journaled in the guide at 56 where it may be secured by riveting or the like.

While, because of its small size and adaptability to being readily mounted in different relations, the fastener is particularly suited to tie-down purposes, it does have many other uses. The part to be secured may be considered and referred to as a bolt, this term being employed in a broad sense.

The reduced stem portion 20 of this bolt serves to accurately center the attached member and the stop shoulder 57 at the back of this centering stem portion, by engagement with the face of the supporting plate, limits the extent of projection of the bolt through the supporting plate to a position where the further reduced, annular locking groove 22 in the bolt will accurately align with the shear plate 16. This structure all assures quick, free engagement and disengagement of the fastener and secured member and firm holding of the latter without looseness or rattling. The spring retaining means in both forms of the invention overcomes any tendency toward looseness and secures the fastener against working loose or being accidentally unlocked.

The washers 34, as shown particularly in Figs. 3, 4, 5 and 6, serve a dual purpose in both spacing the spring retainer plate 35 a proper distance on the back of the supporting plate to yieldingly and slidingly confine the shear plate and limiting the swinging movement of the shear plate, the diameter of such washers being selected to stop the swinging movement in opposite directions to the desired points of registration of the shear plate with the opening in the supporting plate. The latter may be a simple flat plate of desired strength, the only machining operations required, aside from the holes for the mounting screws and the two rivet holes, being the provision of the bolt receiving opening 18 and the closely adjoining bearing opening 26 for the pivot stud 25.

What is claimed is:

1. A fastener for a bolt having an annular locking groove and comprising a supporting plate having an opening to pass that portion of the bolt having the locking groove therein, a shear plate confined to movement on the back of said supporting plate and having a keyhole slot therein with the larger end of said slot of greater diameter than the diameter of the bolt and the smaller end of said slot of less width than the diameter of the bolt but of greater width than the diameter at the annular locking groove in the bolt, the slotted portion of said shear plate being of less thickness than the width of said locking groove and positioned in line with said groove, means operable at the front of said supporting plate for effecting shifting of said shear plate into positions with the larger and the smaller end portions of the keyhole slot in the shear plate in register with the opening in the supporting plate and means for releasably retaining the shear plate in either of the positions described, said retaining means including a spring retainer plate at the back of said shear plate and yieldingly confining the latter against the back of the supporting plate, and companion spring detent means on the meeting faces of said shear plate and spring retainer plate in the form of a projecting spring tongue on the retainer plate having an embossment at the end of the same and companion seats to receive said embossment in the back of the shear plate.

2. A fastener for a bolt having an annular locking groove and comprising a supporting plate having an opening to pass that portion of the bolt having the locking groove therein, a shear plate confined to movement on the back of said supporting plate and having a keyhole slot therein with the larger end of said slot of greater diameter than the diameter of the bolt and the smaller end of said slot of less width than the diameter of the bolt but of greater width than the diameter at the annular locking groove in the bolt, the slotted portion of said shear plate being of less thickness than the width of said locking groove and positioned in line with said groove, means operable at the front of said supporting plate for effecting shifting of said shear plate into positions with the larger and the smaller end portions of the keyhole slot in the shear plate in register with the opening in the supporting plate and means for releasably retaining the shear plate in either of the positions described, said retaining means including a spring retainer plate at the back of said shear plate, fastenings securing said retainer plate to the supporting plate in spaced relation yieldingly confining said shear plate to the back of the supporting plate and companion spring detent means on the meeting faces of said shear plate and retainer plate.

3. A fastener for a bolt having an annular locking groove and comprising a supporting plate having an opening to pass that portion of the bolt having the locking groove therein, a shear plate confined to movement on the back of said supporting plate and having a keyhole slot therein with the larger end of said slot of greater diameter than the diameter of the bolt and the smaller end of said slot of less width than the diameter of the bolt but of greater width than the diameter at the annular locking groove in the bolt, the slotted portion of said shear plate being of less thickness than the width of said locking groove and positioned in line with said groove, means operable at the front of said supporting plate for effecting shifting of said shear plate into positions with the larger and the smaller end portions of the keyhole slot in the shear plate in register with the opening in the supporting plate and means for releasably retaining the shear plate in either of the positions described, said retaining means including a spring retainer plate at the back of said shear plate, spaced fastenings securing said retainer plate to the supporting plate, said shear plate having a movement between and limited in extent by said spaced fastenings for the retainer plate.

4. A fastener for a bolt having an annular locking groove and comprising a supporting plate having an opening to pass that portion of the bolt having the locking groove therein, a shear plate confined to movement on the back of said supporting plate and having a keyhole slot therein with the larger end of said slot of greater diameter than the diameter of the bolt and the smaller end of said slot of less width than the diameter of the bolt but of greater width than the diameter at the annular locking groove in the bolt, the slotted portion of said shear plate being of less thickness than the width of said locking groove and positioned in line with said groove, means operable at the front of said supporting plate for effecting shifting of said shear plate into positions with the larger and the smaller end portions of the keyhole slot in the shear plate in register with the opening in the supporting plate and means for releasably retaining the shear plate in either of the positions described, a stud fixed to said shear plate and having a rotatable bearing in the supporting plate and said stud being exposed at the face of the supporting plate to serve as said means for effecting positioning of the shear plate.

5. A fastener for a bolt having an annular locking groove and comprising a supporting plate having an opening to pass that portion of the bolt having the locking groove therein, a shear plate confined to movement on the back of said supporting plate and having a keyhole slot therein with the larger end of said slot of greater diameter than the diameter of the bolt and the smaller end of said slot of less width than the diameter of the bolt but of greater width than the diameter at the annular locking groove in the bolt, the slotted portion of said shear plate being of less thickness than the width of said locking groove and positioned in line with said groove, means operable at the front of said supporting plate for effecting shifting of said shear plate into positions with the larger and the smaller end portions of the keyhole slot in the shear plate in register with the opening in the supporting plate and means for releasably retaining the shear plate in either of the positions described, a stud fixed to said shear plate and having a rotatable bearing in the supporting plate and said stud being exposed at the face of the supporting plate to serve as said means for effecting positioning of the shear plate, said retaining means including a spring retainer plate secured to the supporting plate at the back of said shear plate, said stud of the shear plate provided with a stem portion having a rotatable bearing in said retainer plate.

6. A fastener of the character disclosed comprising a supporting plate having a bolt opening therethrough and a bearing opening closely adjoining said bolt opening, a shear plate at the back of said supporting plate having a stud on the upper face of the same rotatably engaged in said bearing opening and having a keyhole slot with larger and smaller end portions to register, respectively, with said bolt opening upon swinging movement of said shear plate in opposite directions, a spring retainer plate at the back of said shear plate, spaced fastenings securing said retainer plate to said supporting plate and located at opposite side edges of said shear plate to limit swinging movement of said shear plate in opposite directions, and companion means on said shear plate and retainer plate for yieldingly retaining the shear plate in different positions of adjustment.

7. A fastener of the character disclosed comprising a supporting plate having a bolt opening therethrough and a bearing opening closely adjoining said bolt opening, a shear plate at the back of said supporting plate having a stud on the upper face of the same rotatably engaged in said bearing opening and having a keyhole slot with larger and smaller end portions to register, respectively, with said bolt opening upon swinging movement of said shear plate in opposite directions, a spring retainer plate at the back of said shear plate, spaced fastenings securing said retainer plate to said supporting plate and located at opposite side edges of said shear plate to limit swinging movement of said shear plate in opposite directions, and companion means on said shear plate and retainer plate for yieldingly retaining the shear plate in different positions of adjustment, said stud having a stem portion projecting from the opposite face of the shear plate and said retainer plate having a bearing opening for said projecting stem.

8. A fastener of the character disclosed comprising a supporting plate having a bolt opening therethrough and a bearing opening closely adjoining said bolt opening, a shear plate at the back of said supporting plate having a stud on the upper face of the same rotatably engaged in said bearing opening and having a keyhole slot with larger and smaller end portions to register, respectively, with said bolt opening upon swinging movement of said shear plate in opposite directions, a spring retainer plate at the back of said shear plate, spaced fastenings securing said retainer plate to said supporting plate and located at opposite side edges of said shear plate to limit swinging movement of said shear plate in opposite directions, and companion means on said shear plate and retainer plate for yieldingly retaining the shear plate in different positions of adjustment, said stud having means exposed at the face of the supporting plate for effecting the turning adjustments of said shear plate and said fastenings including rivets securing the retainer plate to the supporting plate, and washers on said rivets of a size to space the retainer plate the approximate thickness of the shear plate away from the supporting plate and of a diameter to stop the turning movements of the shear plate to the desired extreme positions of adjustment of the same.

FRANK L. DAVIS.

References Cited in the file of this patent
UNITED STATES PATENTS

| Number | Name | Date |
|---|---|---|
| 708,903 | McClay | Sept. 9, 1902 |
| 747,683 | Clark | Dec. 22, 1903 |
| 1,804,420 | Kelley | May 12, 1931 |
| 1,823,753 | Muhlfeld | Sept. 15, 1931 |
| 2,420,132 | Gryniuck | May 6, 1947 |
| 2,536,170 | Guest | Jan. 2, 1951 |